United States Patent
Harcourt et al.

(10) Patent No.: US 7,424,703 B1
(45) Date of Patent: Sep. 9, 2008

(54) METHOD AND SYSTEM FOR SIMULATION OF MIXED-LANGUAGE CIRCUIT DESIGNS

(75) Inventors: Edwin A. Harcourt, Townsend, MA (US); Koushik Roy, Tyngsboro, MA (US); Doug Dunlop, Potomac, MD (US); Stuart C. Rae, Jefferson, MA (US); Tuay-Ling K. Lang, Boxborough, MA (US); Andrew Wilmot, Carlisle, MA (US); Bishnupriya Bhattacharya, Sunnyvale, CA (US); Robert Shur, Los Altos, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 384 days.

(21) Appl. No.: 10/405,573

(22) Filed: Apr. 1, 2003

(51) Int. Cl.
*G06F 9/45* (2006.01)

(52) U.S. Cl. .......................... 717/136; 703/14

(58) Field of Classification Search ................. 717/136; 703/14
See application file for complete search history.

(56) References Cited

U.S. PATENT DOCUMENTS

| | | | |
|---|---|---|---|
| 5,732,247 A | 3/1998 | Dearth et al. | |
| 5,774,368 A | 6/1998 | Chen et al. | |
| 5,809,283 A * | 9/1998 | Vaidyanathan et al. | 703/16 |
| 5,848,236 A * | 12/1998 | Dearth et al. | 714/33 |
| 5,857,091 A | 1/1999 | Fernandes et al. | |
| 5,870,588 A | 2/1999 | Rompaey et al. | |
| 5,905,883 A | 5/1999 | Kasuya | |
| 5,999,734 A | 12/1999 | Willis et al. | |
| 6,152,612 A * | 11/2000 | Liao et al. | 703/23 |
| 6,212,667 B1 | 4/2001 | Geer et al. | |
| 6,226,780 B1 | 5/2001 | Bahra et al. | |
| 6,230,307 B1 | 5/2001 | Davis et al. | |
| 6,263,483 B1 | 7/2001 | Dupenloup | |
| 6,466,898 B1 | 10/2002 | Chan | |
| 6,549,881 B1 * | 4/2003 | Dearth et al. | 703/21 |
| 6,789,242 B1 * | 9/2004 | Liu | 716/6 |
| 6,865,525 B1 * | 3/2005 | Zhong | 703/14 |
| 6,882,966 B2 * | 4/2005 | Ryu et al. | 703/14 |
| 7,035,781 B1 * | 4/2006 | Flake et al. | 703/14 |
| 2003/0033588 A1 * | 2/2003 | Alexander | 717/107 |

OTHER PUBLICATIONS

Huang, J. et al., "*Efficient Strategy for Developing a Simulator for a Novel Concurrent Multithreaded Processor Architecture*", IEEE, 1998.

Lewis, D. M., "*A Hierarchical Compiled Code Event-Driven Logic Simulator*", IEEE Transactions On Computer-Aided Design, Jun. 1991, pp. 726-737, vol. 10, No. 6, IEEE.

Mittra, S., "*A Portable Mechanism for Vectorizing Compiled Event-Driven Simulation*", IEEE, 1997, pp. 70-76.

* cited by examiner

*Primary Examiner*—John Chavis
(74) *Attorney, Agent, or Firm*—Vista IP Law Group LLP

(57) ABSTRACT

A method for simulation of mixed-language circuit designs is disclosed. In one embodiment, an object-oriented language module is natively instantiated within a hardware description language based design. In another embodiment, a hardware description language module is natively instantiated within an object-oriented language based design. A system for simulation of mixed-language circuit designs is also disclosed. In one embodiment, a simulator is configured to natively manipulate an object-oriented language module within a hardware description language based design. In another embodiment, a simulator is configured to natively manipulate a hardware description language module within an object-oriented language based design.

57 Claims, 10 Drawing Sheets

METHOD AND SYSTEM FOR SIMULATION OF MIXED-LANGUAGE CIRCUIT DESIGNS

BACKGROUND AND SUMMARY

The present invention is related to simulation of circuit designs. More particularly, the present invention is directed to a method and system for simulation of mixed-language circuit designs.

Circuits have become so complex that it is no longer possible to simply design and build a circuit and expect it to work correctly the first time. Designers use various types of programming languages, such as hardware description languages (e.g., Verilog and VHDL) and object-oriented languages (e.g., C/C++/SystemC and Java), to model new circuit designs by hierarchically defining functional components of a circuit.

The model is then simulated on a computer to see if the design will work as intended. Any problems can be corrected in the model, and the correction verified in simulation. Simulation dynamically verifies a design by monitoring behaviors of the model with respect to simulation test benches.

Designs are often described using the concept of modules. For example, a functional component in a circuit may be described using one or more modules. A module is a syntactic construct in Verilog that is used to define a block. However, the term module is also used loosely by those skilled in the art to designate analogous constructs in other programming languages even though different concepts may be implied. For example, the VHDL equivalent of a module is an architecture and the C++ equivalent of a module is a class. Since a module is generally parameterized, it may be instantiated one or more times in a circuit design. In addition, modules may instantiate other modules.

Each type of programming language has its strengths and weaknesses when used to model an electronic circuit. For example, hardware description languages are excellent solutions for designs that are bound at the register-transfer level and have no software content. In addition, there are many tools available for hardware description language designs and a large number of circuit blocks available for re-use.

However, hardware description languages are not well-suited for testbench generation and testing. Additionally, hardware description languages are not designed with the intent of writing system models. Thus, hardware description languages are not a good fit for hardware/software co-design or for modeling an entire system that is composed of both hardware and software.

Object-oriented languages, on the other hand, have greater expressive power, e.g., classes, inheritance, etc., and are not aimed only at hardware implementation. A system-on-chip (SoC) design may require a number of "views", such as a functional view, an architectural view, a verification view, a software implementation view, and a hardware implementation view. Object-oriented languages work for all of these views and are already being used for architectural definitions. Moreover, as the complexity and size of circuit designs increase, designers will likely move towards describing their designs at higher and higher levels of abstraction in order to enable faster simulation and hardware/software co-description and co-simulation.

Unfortunately, due to the fact that the use of object-oriented languages in modeling of circuit designs is still in its early stages, tool support for object-oriented language designs is weak. Additionally, more circuit designers are familiar with hardware description languages than with object-oriented languages.

Given the advantages and disadvantages of each type of programming language and the current trend of re-using design blocks created in earlier circuit designs to increase design speed and efficiency, circuit designs may comprise components written in both hardware description and object-oriented languages. Thus, there is a need for a method and system that would allow hardware description languages and object-oriented languages to be seamlessly integrated in one design.

Currently, connectivity between hardware description languages and object-oriented languages is provided via a basic application programming interface (API), in which standard call interfaces are used by programmers to allow a hardware description language based design to interact with an object-oriented language component. One drawback of this approach is that a designer is required to specifically know and recognize the proper API calls that must be made to implement connectivity. Other drawbacks of the API approach include: simulation speed limitations, difficulty in debugging, and no allowance for free mixing and replacement of object-oriented language and hardware description language design blocks.

In addition, the API approach does not provide seamless integration of hardware description language (HDL) and object-oriented language (OOL) in one design. Specifically, designers in a hardware description language modeling environment would not have the same level of access to OOL modules as HDL modules. For example, a designer would not be able to browse the source code for the object-oriented language block, step through it, or set break-points in it. An object-oriented module in an HDL modeling environment is essentially a black box, i.e., a designer is not able to look into the box. The same is true the other way around, i.e., an HDL module in an object-oriented language modeling environment would be unobservable from the outside.

The present invention provides a method and system for simulation of mixed-language circuit designs. In one embodiment, a simulator is configured to natively manipulate an object-oriented language module within a hardware description language based design. In another embodiment, a simulator is configured to natively manipulate a hardware description language module within an object-oriented language based design. In a further embodiment, an object-oriented language module is natively instantiated within a hardware description language based design. In a still further embodiment, a hardware description language module is natively instantiated within an object-oriented language based design.

Further details of aspects, objects, and advantages of the invention are described below in the detailed description, drawings, and claims. Both the foregoing general description and the following detailed description are exemplary and explanatory, and are not intended to be limiting as to the scope of the invention.

BRIEF DESCRIPTION OF THE DRAWINGS

The accompanying drawings are included to provide a further understanding of the invention and, together with the Detailed Description, serve to explain the principles of the invention.

DETAILED DESCRIPTION

More and more designers are using both hardware description and object-oriented languages to model their designs in order to utilize the strengths of each type of programming language. As a result, there is a need for a method and system that would allow hardware description languages and object-oriented languages to be seamlessly integrated in one design.

Figure 1:
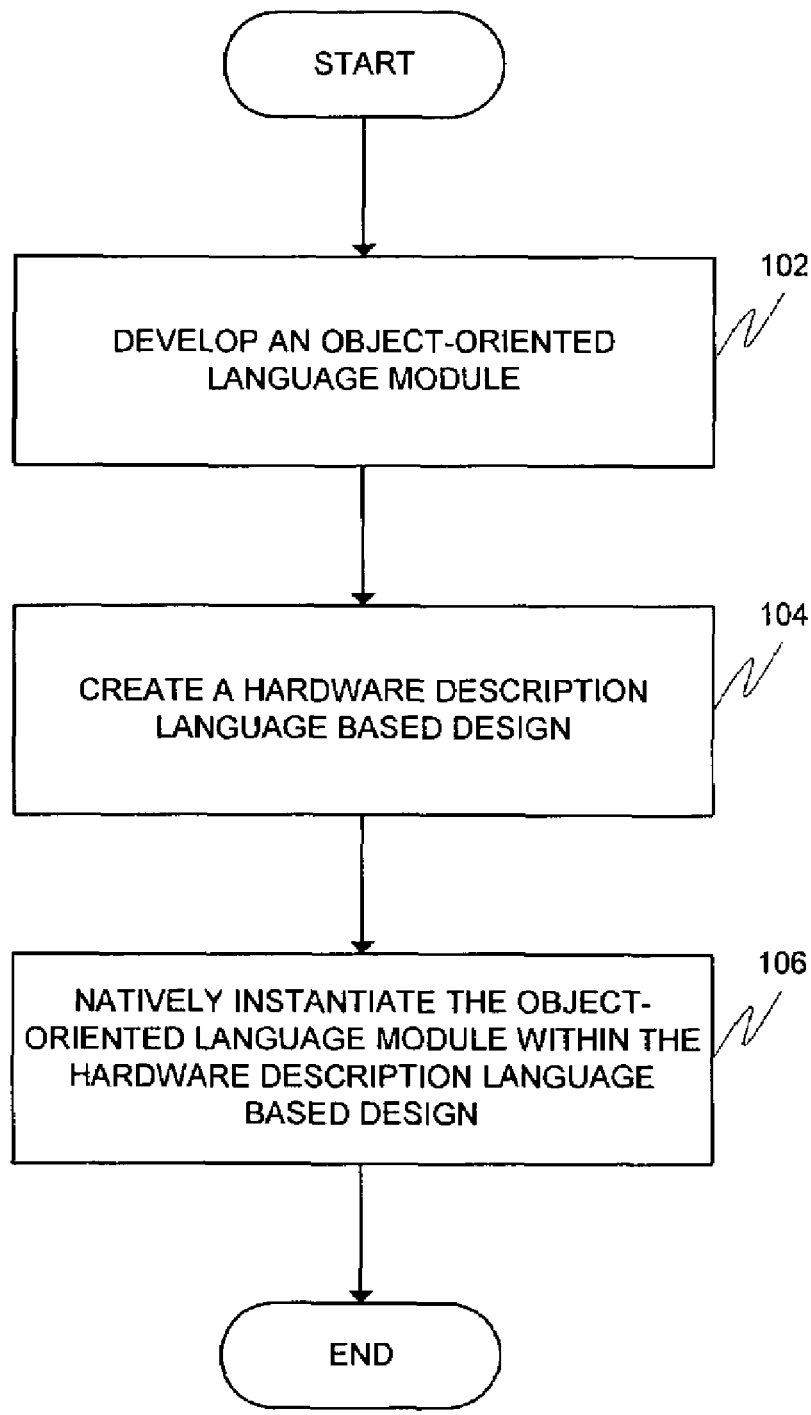
FIG. 1 is a flow chart of a method for simulation of mixed-language circuit designs according to one embodiment of the invention.

FIG. 1 illustrates a flowchart of one embodiment of a method for simulation of mixed-language circuit designs. An object-oriented language module is developed (102). The object-oriented language module may be described in C, C++, SystemC, Java, and other object-oriented programming languages using a normal text editor or design tools. A hardware description language based design is created (104). Hardware description languages include, for example, Verilog and VHDL. The object-oriented language module is natively instantiated within the hardware description language based design (106). A module is instantiated when it is named inside another module. The following is an example of one Verilog module instantiating another Verilog module.

```
module B;
(* a dummy empty module *)
endmodule
module Top;
B b; (* this is the instantiation of an instance of module B
(named b) in module Top *)
endmodule
```

Figure 2:
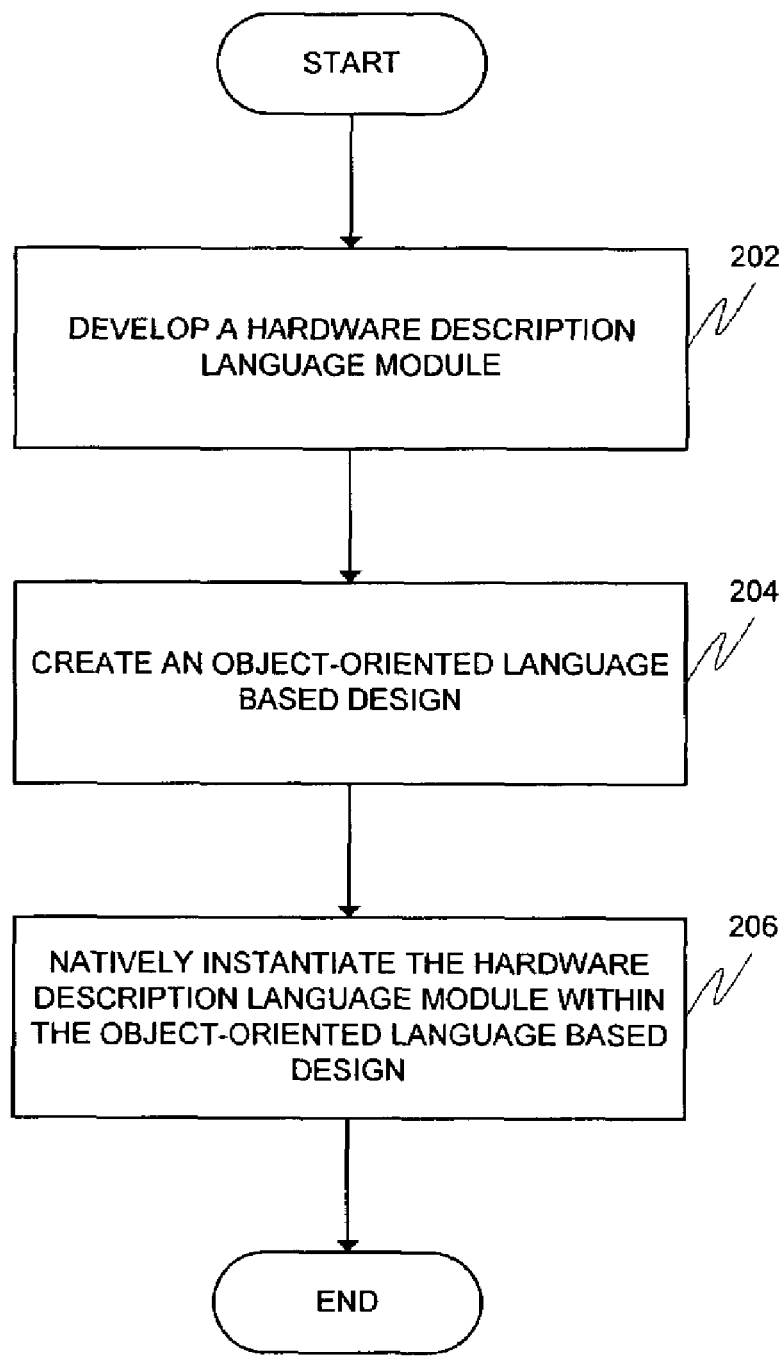
FIG. 2 illustrates a process flow of a method for simulation of mixed-language circuit designs according to another embodiment of the invention.

In FIG. 2, a process flow of another embodiment of a method for simulation of mixed-language circuit designs is shown. A hardware description language module is developed (202). An object-oriented language based design is created (204). The hardware description language module is natively instantiated within the object-oriented language based design (206).

Figure 3:
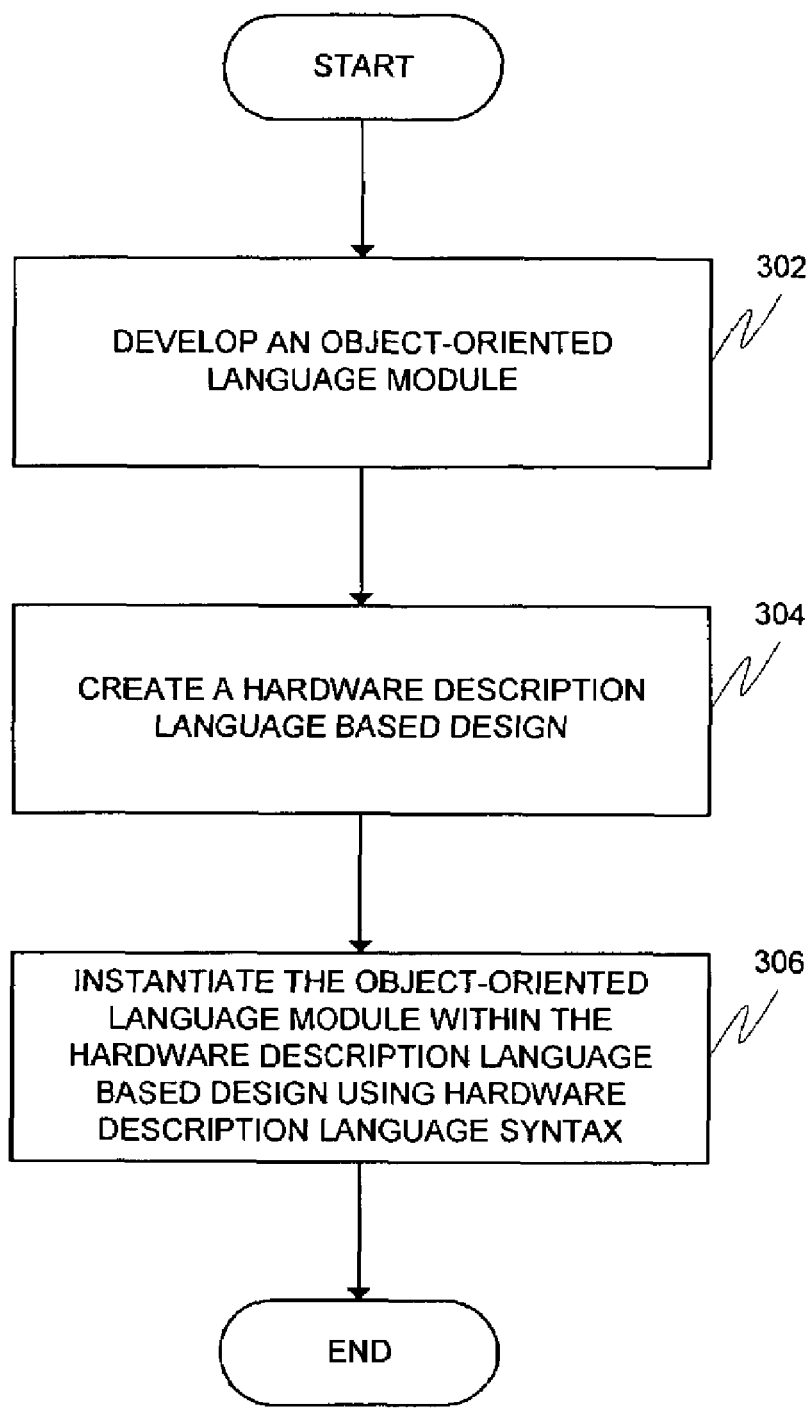
FIG. 3 depicts one embodiment of a method for simulation of mixed-language circuit designs.

Referring to FIG. 3, a method of simulating mixed-language circuit designs according to one embodiment of the invention is illustrated. An object-oriented language module is developed (302). A hardware description language based design is created (304). The object-oriented language module is instantiated within the hardware description language based design using hardware description language syntax (306). The following is an example of a VHDL module instantiating a SystemC module.

```
-- SystemC module
class model : public sc_module {
public:
sc_in<sc_logic>in;
sc_out<sc_logic>out;
SC_CTOR(model) : in ("inPort"), out("outPort") {
    SC_METHOD(run);
    sensitive<<in;
}
~model( ) { }
void run( ) {out.write(in.read( )); }
};
-- VHDL shell for SystemC module
architecture SystemC of model is
-- The following line indicates that the body of this architecture is described elsewhere as
-- a SystemC module
attribute foreign of SystemC : architecture is "SystemC";
begin
end;
-- VHDL module instantiating SystemC module using VHDL shell
entity top is end;
architecture T of top is
signal inPort :std_logic;
signal outPort : std_logic;
begin
-- The following line is the instantiation of an instance of
    SystemC module
test : entity work.model port map (inPort, outPort);
process (outPort)
begin end process;
end;
entity model is
port (
    inPort : in std_logic;
    outPort : out std_logic
);
end;
```

Figure 4:
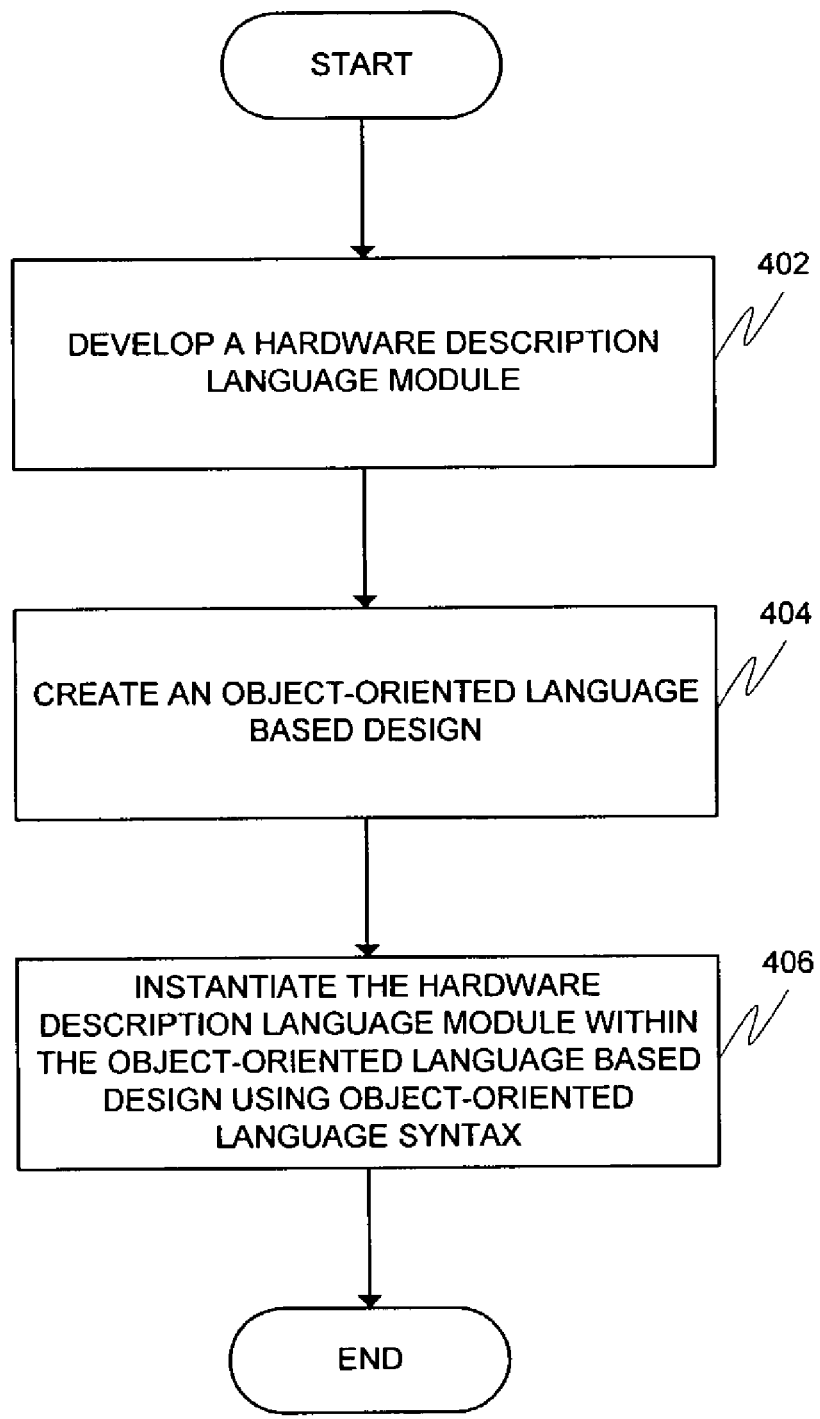
FIG. 4 shows another embodiment of a method for simulation of mixed-language circuit designs.

FIG. 4 depicts a method of simulating mixed-language circuit designs according to another embodiment of the invention. A hardware description language module is developed (402). An object-oriented language based design is created (404). The hardware description language module is instantiated within the object-oriented language based design using object-oriented language syntax (406). Below is an example of a SystemC module instantiating a Verilog module.

```
/* Verilog module */
module vchild(in, out);
input in;
output out;
reg outReg;
initial begin
    outReg=1'b0;
    #10 $finish;
end
assign out=outReg;
endmodule
/* SystemC shell module for Verilog module */
class vchild : public ncsc foreign module {
public:
sc_in<sc_logic>in;
sc_out<sc_logic>out;
vchild(sc_module_name nm);
    ncsc_foreign_module(nm), in("in"), out("out") { }
}
/* SystemC module instantiates Verilog module using SystemC shell */
class sctop : public sc_module {
public:
SC_CTOR(sctop) : port("port"), vlocal("vlocal") {
    vlocal.in(port);
    vlocal.out(port);
}
protected:
sc_signal<sc_logic>port;
vchild vlocal; /* this is the instantiation of an instance of
    Verilog module vchild */
};
```

Figure 5:
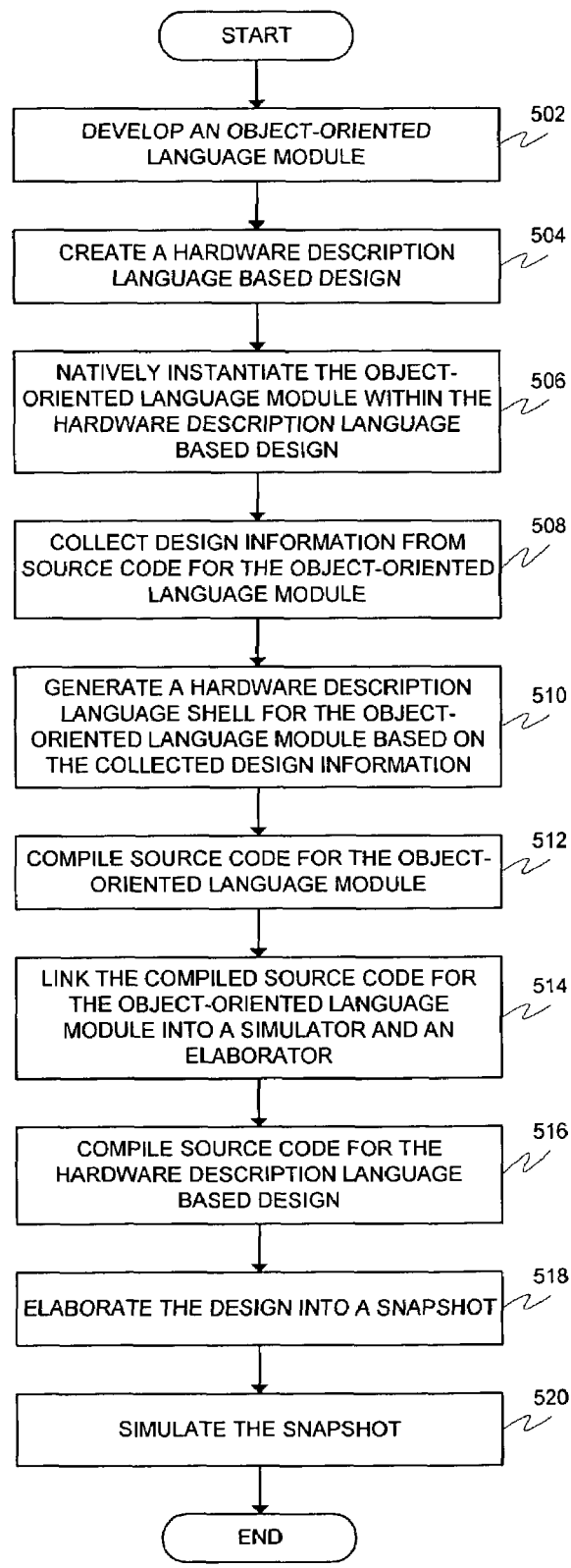
FIG. 5 is a flow chart of a method of simulating mixed-language circuit designs according to one embodiment of the invention.

In FIG. 5, one method for simulation of mixed-language circuit designs is shown. In the embodiment, an object-oriented language module is developed (502). A hardware description language based design is created (504). The object-oriented language module is natively instantiated within the hardware description language based design (506). Design information is collected from source code for the object-oriented language module (508). The collected design information may be used for shell generation or source browsing. Source browsing is the ability to hierarchically navigate a design in an editor. For example, source browsing may include double-clicking on a module name in the editor to go to the definition of that module or hovering a cursor over the name of a port to find out the current value of that port.

A hardware description language shell is generated for the object-oriented language module based on the collected design information (510). A shell is a wrapper surrounding a module instantiated within another module that is written in the programming language of the parent module. It is a dummy module that provides an interface between the parent block and the child block. For example, a shell may define input and output ports of a child module. The shell is essentially a placeholder for the child block that is not described in the same programming language as the parent block. Thus, the object-oriented language block appears to be just another hardware description language block.

Source code for the object-oriented language module is compiled into object form (512). The compiled source code for the object-oriented language module is then linked into a simulator and an elaborator (514). Linking is a technique for including the object-oriented language module in the simulator and the elaborator so that it can be called during simulation and elaboration.

The object-oriented language module may be statically linked into the simulator and/or elaborator by linking the compiled source code for the object-oriented language module with the simulation and/or elaboration executables to generate new executable(s) that contain the statically linked object-oriented language module. Alternatively, the object-oriented language module may be dynamically linked into the simulator and/or elaborator by building a shared library from the compiled source code for the object-oriented language module, which can then be loaded by the simulator and/or elaborator during simulation and/or elaboration. The shared library may contain one or more object files. Dynamic linking is faster than static linking. In addition, simulation and/or elaboration executables need not be rebuilt to contain the object-oriented language module. However, static linking may be more reliable for debugging on certain platforms.

Source code for the hardware description language based design is compiled (516). Compiling the source code for the hardware description language based design produces an intermediate representation of the hardware description language based design. The design is elaborated into a snapshot, i.e., an instantiated design hierarchy, using the intermediate representation of the hardware description language based design (518). Elaboration of a design may result in the building of a design hierarchy based on the instantiation and configuration information in the design, the establishment of signal connectivity, and the computation of initial values for all of the objects in the design.

In one embodiment, the intermediate representation of the hardware description language based design is traversed during elaboration. When a module instance is a hardware description language module, the normal hardware description language elaboration proceeds. Conversely, when a module instance is a hardware description language shell for an object-oriented language module, a constructor is called for the object-oriented language module to connect signals from the hardware description language module to signals of the object-oriented language module. A constructor represents functions that constructs an object of a particular class. After module connectivity is established, a separate traversal of the intermediate representation of the hardware description language based design is made to assign initial values to all of the signals, i.e., wires, in the hardware description language based design.

Figure 6:
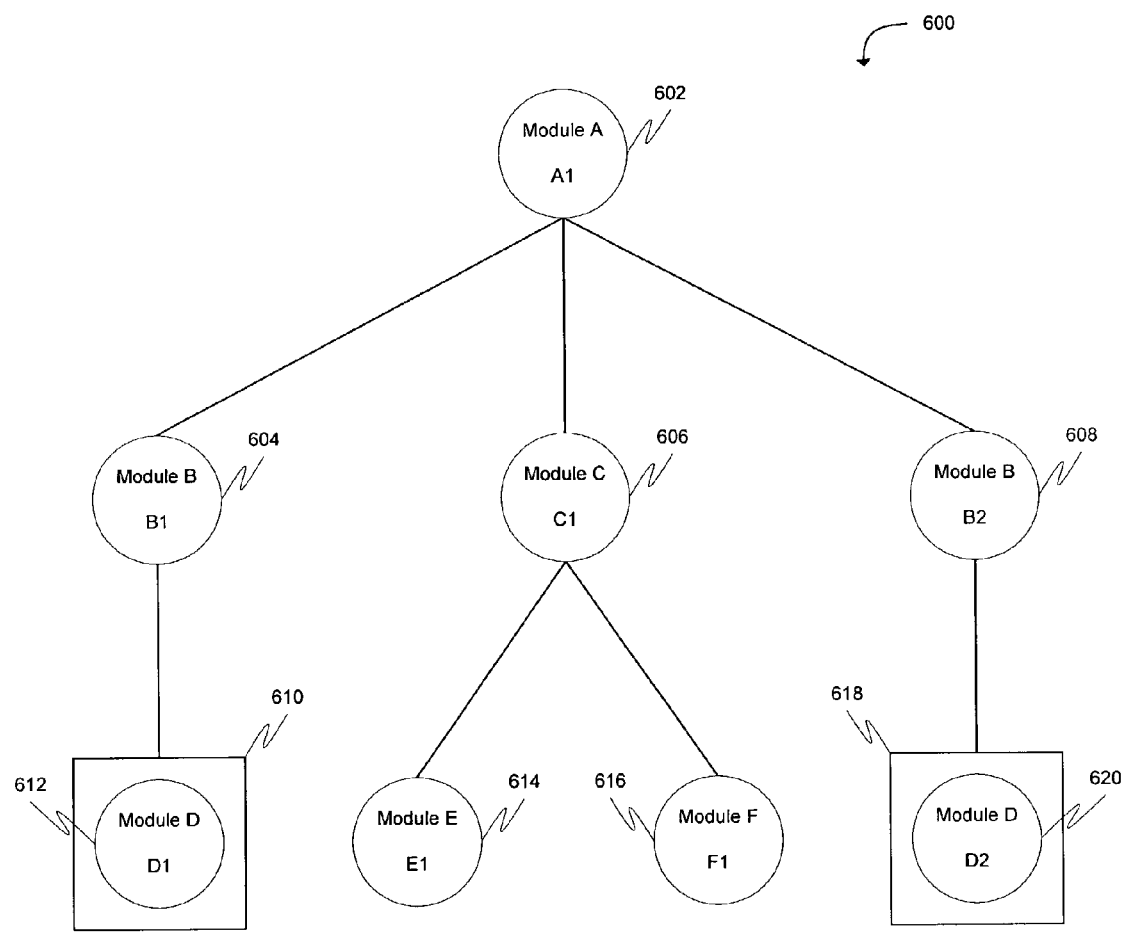
FIG. 6 illustrates an example of a design hierarchy built during elaboration according to an embodiment of the invention.

FIG. 6 illustrates an example of a design hierarchy built during elaboration. A design hierarchy 600 is shown in FIG. 6. The design comprises six modules, A, B, C, D, E, and F. Modules A, C, E, and F have each been instantiated once. Modules B and D have each been instantiated twice. Instance A1 602 has three child instances, B1 604, C1 606, and B2 608. Instance C1 606 has two child instances, E1 614 and F1 616. Since instances B1 604 and B2 608 have been instantiated from the same module B, each instance will have child instances from the same module. For example, instance B1 604 has a child instance D1 612 instantiated from module D and instance B2 608 has a child instance D2 620 also instantiated from module D. There is a shell 610 surrounding D1 612 and a shell 618 surrounding D2 620 because module D has been developed using a programming language different from module B. Shells 618 and 620 provides an interface between instance B1 604 and instance D1 612 and between instance B2 608 and instance D2 620. The following Verilog modules represent an instantiation of the design hierarchy depicted in FIG. 6.

```
module top;
  A A1; (* 602*)
end module
module A;
  B B1; (* 604 *)
  C C1; (* 606 *)
  B B2; (* 608 *)
endmodule
module B;
  D D1; (* 612 *)
endmodule
module C;
  E E1; (* 614 *)
  F F1; (* 616 *)
endmodule
module E;
endmodule
module F;
endmodule
module D;
  (* integer foreign="SystemC"; *);
endmodule
```

The snapshot is simulated (520). In one embodiment, a simulator is invoked to simulate the design by loading the snapshot generated as well as other objects that are referenced by the snapshot. In addition, the simulator may also load source files, script files, and other data files as needed.

Figure 7:
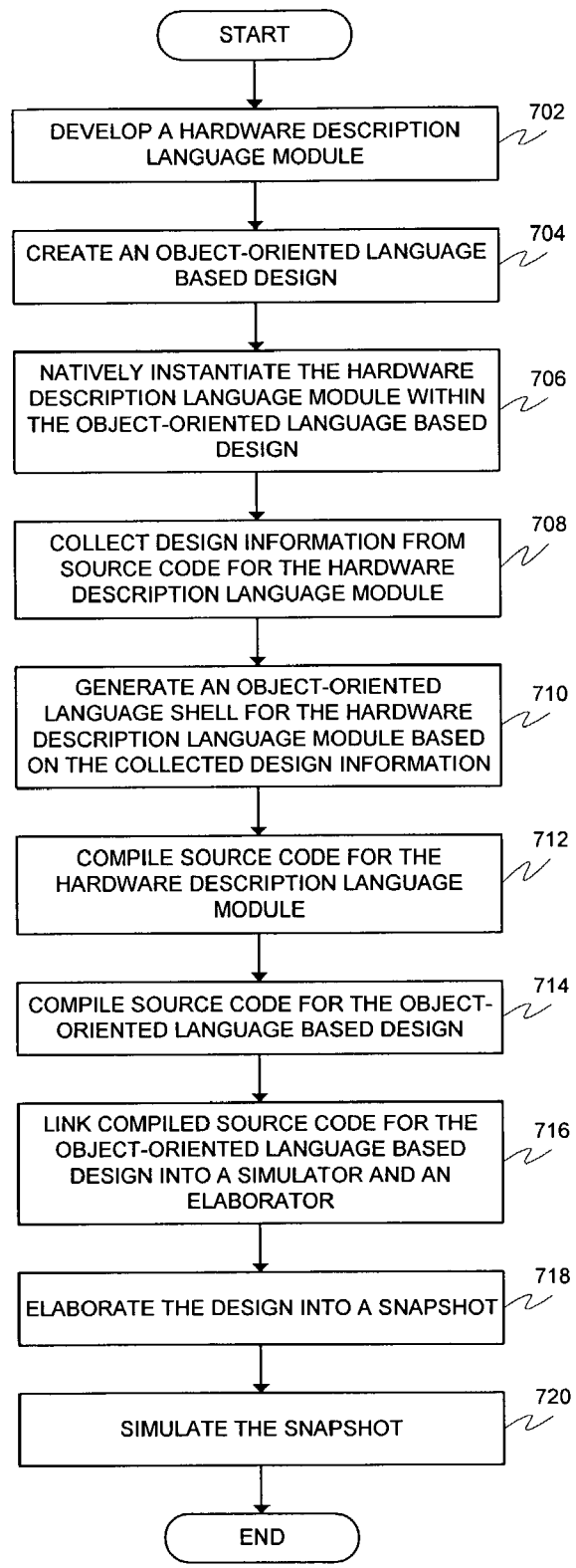
FIG. 7 depicts a process flow of a method of simulating mixed-language circuit designs according to another embodiment of the invention.

Referring to FIG. 7, another method for simulation of mixed-language circuit designs is illustrated. A hardware description language module is developed (702). An object-oriented language based design is created (704). The hardware description language module is natively instantiated within the object-oriented language based design (706). Design information is collected from source code for the hardware description language module (708). An object-oriented language shell is generated for the hardware description language module based on the collected design information (710). Source code for the hardware description language module is compiled (712). Source code for the object-oriented language based design is compiled (714). The compiled source code for the object-oriented language based design is linked into a simulator and an elaborator (716). The design is elaborated into a snapshot (718) and the snapshot is simulated (720).

Figure 8:
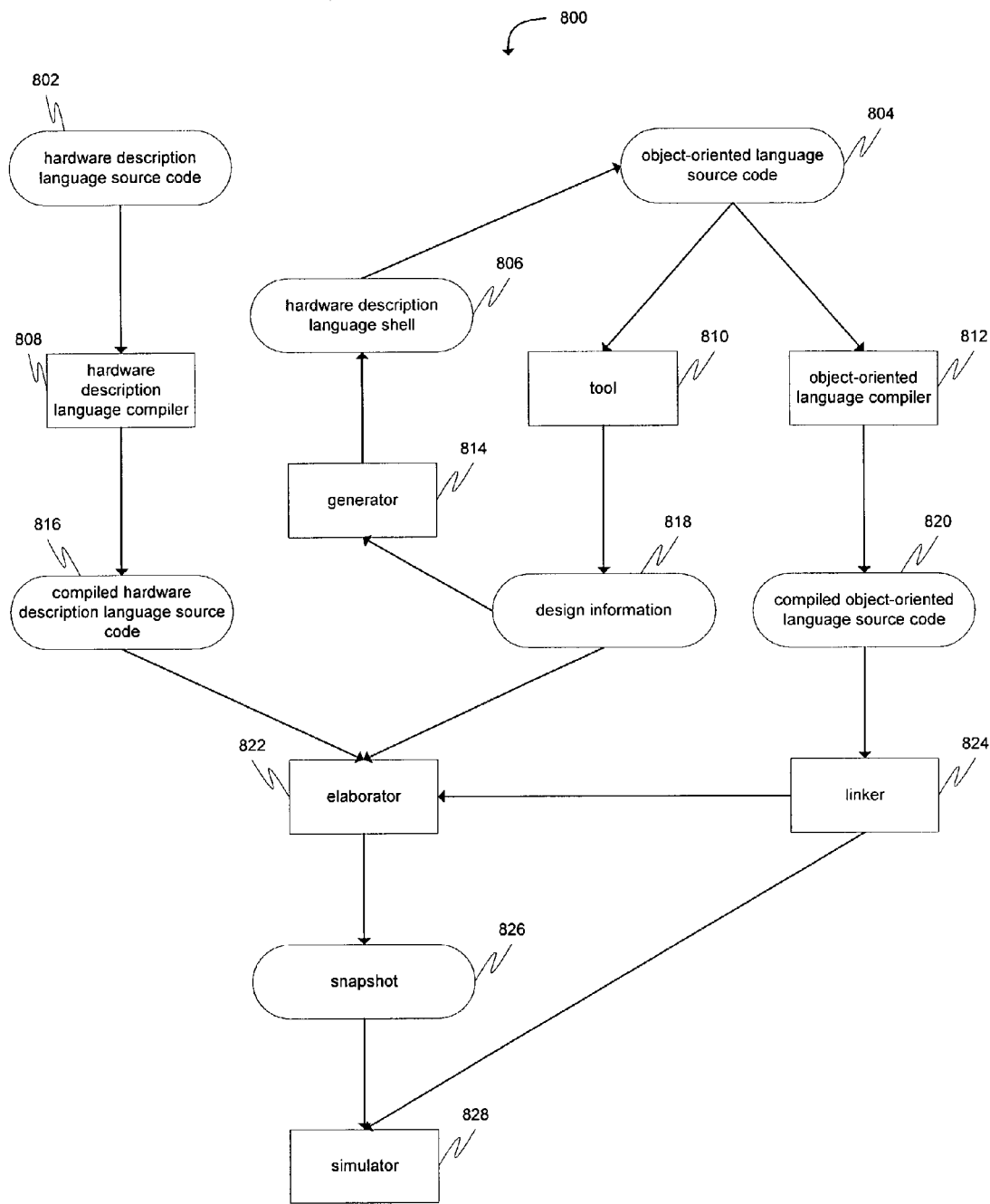
FIG. 8 shows a design flow of a system for simulation of mixed-language circuit designs according to one embodiment of the invention.

FIG. 8 illustrates a design flow of a system for simulation of mixed-language circuit designs according to one embodiment of the invention. System 800 comprises a hardware description language compiler 808, a tool 810, an object-oriented language compiler 812, a generator 814, an elaborator 822, a linker 824, and a simulator 828.

In FIG. 8, simulator 828 is configured to natively manipulate an object-oriented language module within a hardware description language based design. Tool 810 is configured to collect design information 818 from source code 804 for the object-oriented language module. For example, tool 810 may parse source code 804 in order to collect design information 818. Generator 814 is configured to generate a hardware description language shell 806 based on the collected design information 818. Object-oriented language compiler 812 is configured to compile source code 804 for the object-oriented language module into object form. In one embodiment, tool 810 is also configured to invoke object-oriented language compiler 812 to compile object-oriented language source code 804.

Linker 824 is configured to link compiled object-oriented language source code 820 into simulator 828. Linker 824 may also be configured to link compiled object-oriented language source code 820 into elaborator 822. In one embodiment, object-oriented language compiler 812 is configured to invoke linker 824 to link compiled object-oriented language source code 820 into simulator 828 and/or elaborator 822.

Compiled object-oriented language source code 820 may be dynamically or statically linked into simulator 828 and elaborator 822. With dynamic linking, linker 824 may build a shared library from compiled object-oriented language source code 820. The shared library can then be loaded by simulator 828 and/or elaborator 822 during simulation and/or elaboration. For static linking, simulator 828 executables may be rebuilt by linker 824 to link compiled object-oriented language source code 820 into simulator 828. In addition, elaborator 822 executables may also be rebuilt by linker 824 to statically link compiled object-oriented language source code 820 into elaborator 822.

Hardware description language compiler 808 is configured to compile source code 802 for the hardware description language based design. Hardware description language compiler 808 may analyze hardware description language source code 802, perform syntactic checking on hardware description language design units (e.g., modules, macromodules, or user defined primitives (UDPs)) in source code 802, and generate an intermediate representation for each hardware description language design unit.

Elaborator 822 is configured to elaborate the design into a snapshot 826. A design hierarchy may be constructed by elaborator 822 based on the instantiation and configuration information in the design. Elaborator 822 may also establish signal connectivity and compute initial values for all objects in the design. Snapshot 826 contains simulation data at simulation time zero and is the input for simulator 828. Simulator 828 is configured to simulate snapshot 826.

Figure 9:
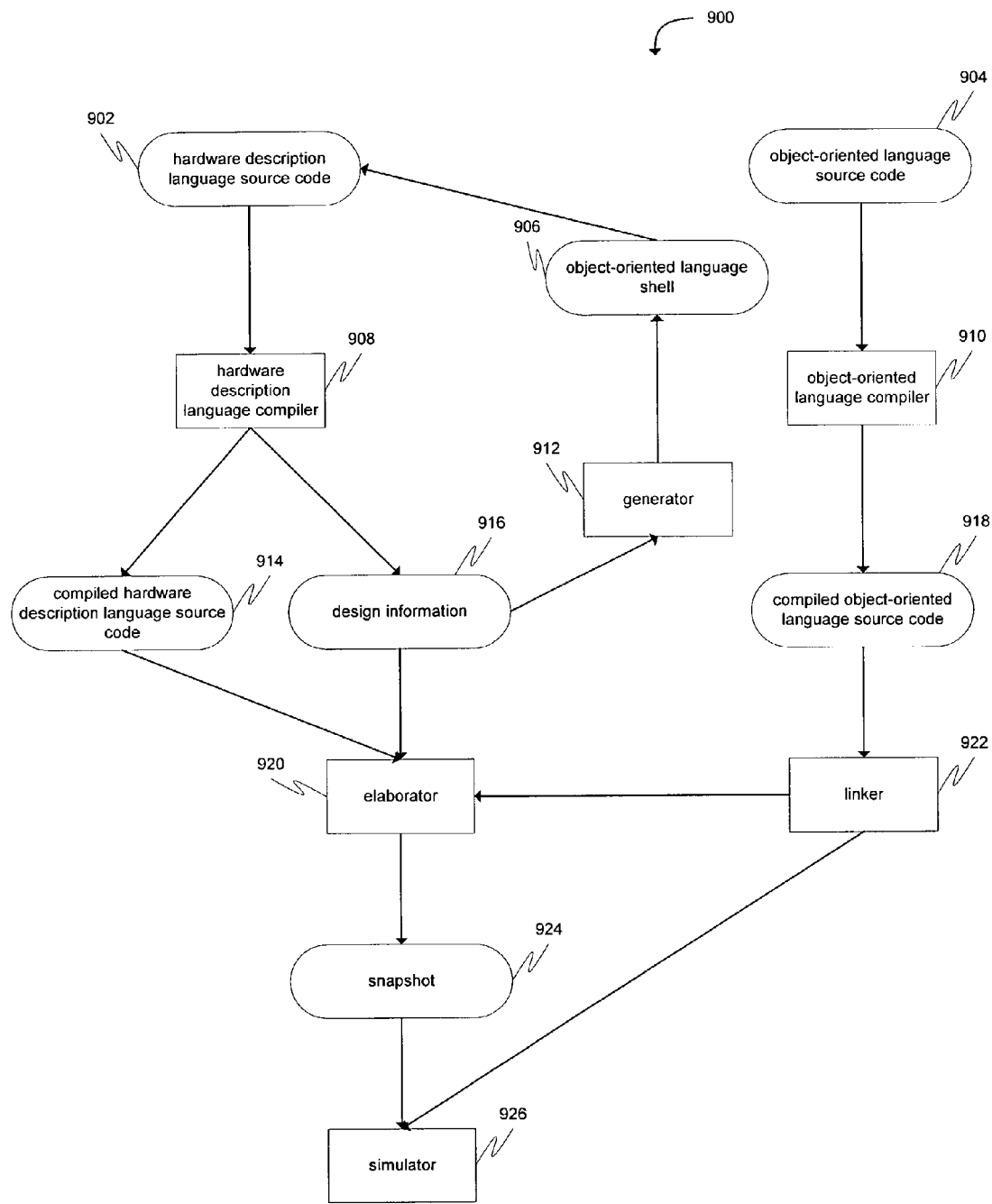
FIG. 9 illustrates a design flow of a system for simulation of mixed-language circuit designs according to another embodiment of the invention.

Referring to FIG. 9, a system 900 for simulation of mixed-language circuit designs is depicted. System 900 comprises a hardware description language compiler 908, an object-oriented language compiler 910, a generator 912, an elaborator 920, a linker 922, and a simulator 926. Simulator 926 is configured to natively manipulate a hardware description language module within an object-oriented language based design.

Hardware description language compiler 908 is configured to compile source code 902 for the hardware description language module. Hardware description language compiler 908 is also configured to collect design information from hardware description language source code 902. In another embodiment, a separate tool may be used to collect design information 916 from hardware description language source code 902 instead. Generator 912 is configured to generate an object-oriented language shell 906 based on the collected design information 916.

Object-oriented language compiler 910 is configured to compile source code 904 for the object-oriented language based design into object form. Linker 922 is configured to link compiled object-oriented language source code 918 into simulator 926. In one embodiment, linker 922 is also configured to link compiled object-oriented language source code 918 into elaborator 920. Elaborator 920 is configured to elaborate the design into a snapshot 924. Simulator 926 is configured to simulate snapshot 924.

System Architecture Overview

Figure 10:
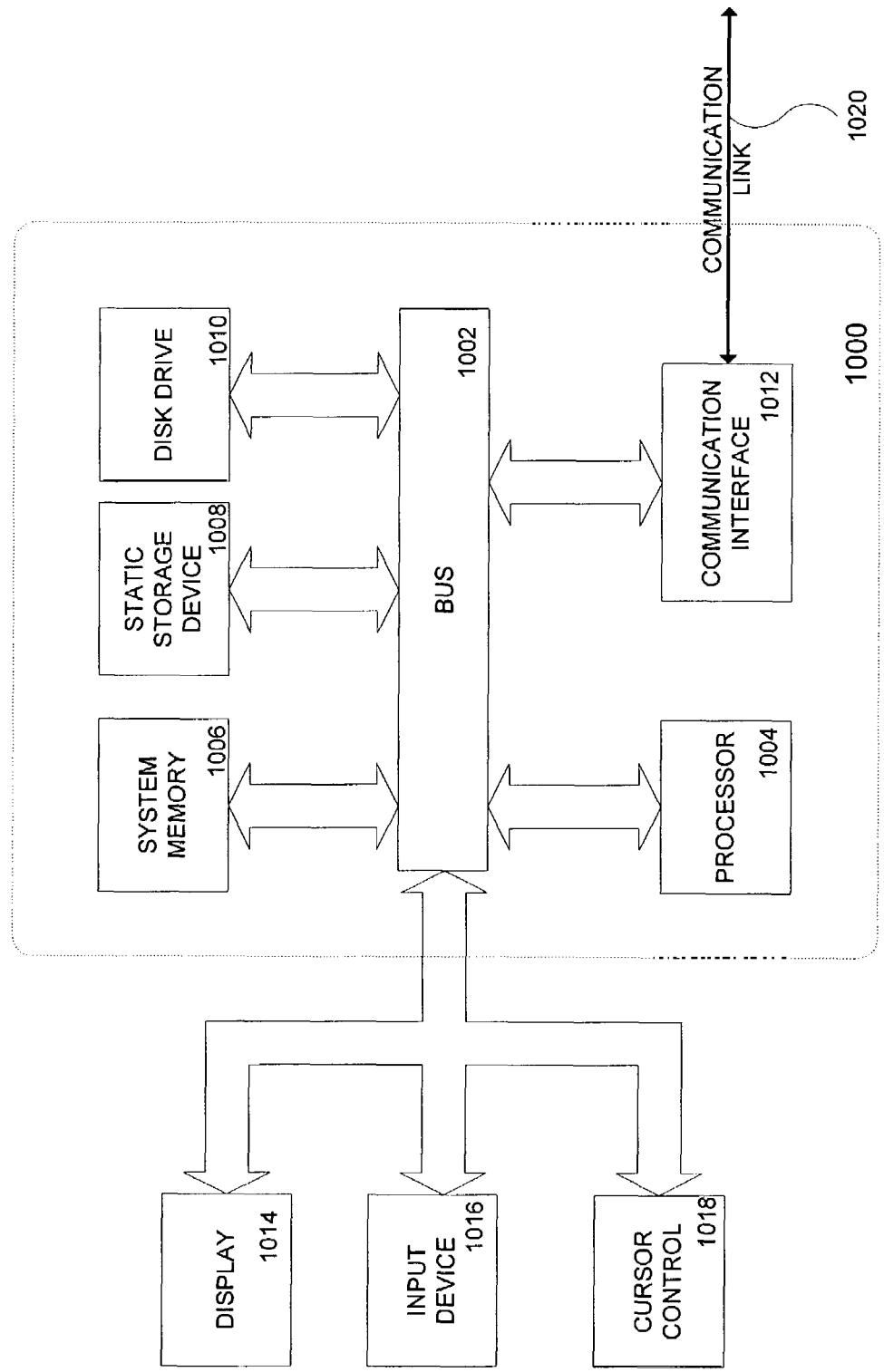
FIG. 10 is a diagram of a computer system with which embodiments of the present invention can be implemented.

FIG. 10 is a block diagram of a computer system 1000 suitable for implementing an embodiment of the present invention. Computer system 1000 includes a bus 1002 or other communication mechanism for communicating information, which interconnects subsystems and devices, such as processor 1004, system memory 1006 (e.g., RAM), static storage device 1008 (e.g., ROM), disk drive 1010 (e.g., magnetic or optical), communication interface 1012 (e.g., modem or ethernet card), display 1014 (e.g., CRT or LCD), input device 1016 (e.g., keyboard), and cursor control 1018 (e.g., mouse or trackball).

According to one embodiment of the invention, computer system 1000 performs specific operations by processor 1004 executing one or more sequences of one or more instructions contained in system memory 1006. Such instructions may be read into system memory 1006 from another computer readable medium, such as static storage device 1008 or disk drive 1010. In alternative embodiments, hard-wired circuitry may be used in place of or in combination with software instructions to implement the invention.

The term "computer readable medium" as used herein refers to any medium that participates in providing instructions to processor 1004 for execution. Such a medium may take many forms, including but not limited to, non-volatile media, volatile media, and transmission media. Non-volatile media includes, for example, optical or magnetic disks, such as disk drive 1010. Volatile media includes dynamic memory, such as system memory 1006. Transmission media includes coaxial cables, copper wire, and fiber optics, including wires that comprise bus 1002. Transmission media can also take the form of acoustic or light waves, such as those generated during radio wave and infrared data communications.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer can read.

In an embodiment of the invention, execution of the sequences of instructions to practice the invention is performed by a single computer system 1000. According to other embodiments of the invention, two or more computer systems 1000 coupled by communication link 1020 (e.g., LAN, PTSN, or wireless network) may perform the sequence of instructions required to practice the invention in coordination with one another.

Computer system 1000 may transmit and receive messages, data, and instructions, including program, i.e., application code, through communication link 1020 and communication interface 1012. Received program code may be executed by processor 1004 as it is received, and/or stored in disk drive 1010, or other non-volatile storage for later execution.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

The invention claimed is:

1. A system including a processor for simulation of mixed-language circuit designs comprising:
   a first compiler that compiles source code for a hardware description language based design;
   an elaborator configured to elaborate the hardware description language based design into a snapshot, wherein the design comprises an hardware description language module and an object-oriented language module;
   a second compiler that compiles source code for the object-oriented language module, the second compiler is separate from the first compiler; and
   a simulator configured to natively manipulate the object-oriented language module instantiated within the hardware description language based design, wherein the act of natively manipulating comprises providing source browsing for both the hardware description language module and the object-oriented language module.

2. The system of claim 1 further comprising:
   a linker configured to link the compiled source code for the object-oriented language module into the simulator.

3. The system of claim 2 wherein the linker is further configured to link the compiled source code for the object-oriented language module into the elaborator.

4. The system of claim 1 further comprising a tool configured to collect design information from source code for the object-oriented language module.

5. The system of claim 4 further comprising a generator configured to generate a hardware description language shell for the object-oriented language module based on the collected design information.

6. A system including a processor for simulation of mixed-language circuit designs comprising:
   a simulator configured to natively manipulate an object-oriented language module instantiated within a hardware description language based design using hardware description language syntax after source code for the hardware description language based design and source code for the object-oriented language module are separately compiled, wherein the act of natively manipulating comprises providing source browsing for both a hardware description language module and the object-oriented language module.

7. The system of claim 6 further comprising an elaborator configured to elaborate the design into a snapshot.

8. The system of claim 7 further comprising a compiler configured to compile source code for the object-oriented language module.

9. The system of claim 8 further comprising a linker configured to link the compiled source code for the object-oriented language module into the simulator.

10. The system of claim 9 wherein the linker is further configured to link the compiled source code for the object-oriented language module into the elaborator.

11. The system of claim 9 wherein the compiler is further configured to invoke the linker to link the compiled source code for the object-oriented language module into the simulator.

12. The system of claim 8 further comprising a tool configured to collect design information from the source code for the object-oriented language module.

13. The system of claim 12 wherein the tool is further configured to invoke the compiler to compile the source code for the object-oriented language module.

14. The system of claim 12 further comprising a generator configured to generate a hardware description language shell for the object-oriented language module based on the collected design information.

15. The system of claim 7 further comprising a compiler configured to compile source code for the hardware description language based design.

16. The system of claim 7 wherein the simulator is further configured to simulate the snapshot.

17. A system including a processor for simulation of mixed-language circuit designs comprising:
   a first compiler that compiles source code for an object-oriented language based design,
   an elaborator configured to elaborate the object-oriented language based design into a snapshot wherein the design comprises an hardware description language module and an object-oriented language module;
   a second compiler that compiles source code for the hardware description language module; and
   a simulator configured to natively manipulate the hardware description language module instantiated within the object-oriented language based design, wherein the act of natively manipulating comprises providing source browsing for both the hardware description language module and the object-oriented language module.

18. The system of claim 17 wherein the second compiler is further configured to collect design information from source code for the hardware description language module.

19. The system of claim 18 further comprising a generator configured to generate an object-oriented language shell for the hardware description language module based on the collected design information.

20. The system of claim 17 further comprising a linker configured to link the compiled source code for the object-oriented language based design into the simulator and the elaborator.

21. A system including a processor for simulation of mixed-language circuit designs comprising:
   a simulator configured to natively manipulate a hardware description language module instantiated within an object-oriented language based design using object-oriented language syntax after source code for the hardware description language module and source code for the object-oriented language based design are separately compiled, wherein the act of natively manipulating comprises providing source browsing for both the hardware description language module and an object-oriented language module.

22. The system of claim 21 further comprising an elaborator configured to elaborate the design into a snapshot.

23. The system of claim 22 further comprising a compiler configured to compile source code for the hardware description language module.

24. The system of claim 23 wherein the compiler is further configured to collect design information from the source code for the hardware description language module.

25. The system of claim 24 further comprising a generator configured to generate an object-oriented language shell for the hardware description language module based on the collected design information.

26. The system of claim 22 further comprising a compiler configured to compile source code for the object-oriented language based design.

27. The system of claim 26 further comprising a linker configured to link the compiled source code for the object-oriented language based design into the simulator and the elaborator.

28. The system of claim 27 wherein the compiler is further configured to invoke the linker to link the compiled source code for the object-oriented language based design into the simulator and the elaborator.

29. The system of claim 22 wherein the simulator is further configured to simulate the snapshot.

30. A method of simulating mixed-language circuit designs comprising:
    natively instantiating an object-oriented language module within a hardware description language based design, wherein the design comprising an hardware description language module and the object-oriented language module, wherein the act of natively instantiating comprises providing source browsing for both the hardware description language module and the object-oriented language module;
    collecting design information from source code for the object-oriented language module;
    generating a hardware description language shell for the object-oriented language module based on the collected design information;
    compiling source code for the object-oriented language module;
    compiling source code for the hardware description language based design separately from compiling source code for the object-oriented language module;
    elaborating the hardware description language based design into a snapshot; and
    simulating the snapshot.

31. The method of claim 30 wherein elaborating the hardware description language based design comprises:
    constructing a design hierarchy based on instantiation and configuration information in the design;
    establishing signal connectivity; and
    computing initial values for all module instances in the design.

32. The method of claim 30 wherein natively instantiating an object-oriented language module within a hardware description language based design comprises instantiating the object-oriented language module using hardware description language syntax.

33. The method of claim 30 further comprising linking the compiled source code for the object-oriented language module into a simulator and an elaborator.

34. A method of simulating mixed-language circuit designs comprising:
    natively instantiating an object-oriented language module within a hardware description language based design, wherein the design comprises an hardware description language module and the object-oriented language module, wherein the act of natively instantiating comprises providing source browsing for both the hardware description language module and the object-oriented language module; and
    simulating the object-oriented language module instantiated within the hardware description language based design after separately compiling source code for the object-oriented language module and source code for the hardware description language based design.

35. The method of claim 34 wherein natively instantiating an object-oriented language module within a hardware description language based design comprises instantiating the object-oriented language module using hardware description language syntax.

36. The method of claim 34 further comprising collecting design information from source code for the object-oriented language module.

37. The method of claim 36 further comprising generating a hardware description language shell for the object-oriented language module based on the collected design information.

38. The method of claim 34 further comprising compiling source code for the object-oriented language module.

39. The method of claim 38 further comprising linking the compiled source code for the object-oriented language module into a simulator and an elaborator.

40. The method of claim 34 further comprising compiling source code for the hardware description language based design.

41. The method of claim 34 further comprising elaborating the design into a snapshot.

42. The method of claim 41 wherein elaborating the design comprises:
    constructing a design hierarchy based on instantiation and configuration information in the design;
    establishing signal connectivity; and
    computing initial values for all module instances in the design.

43. The method of claim 41 further comprising simulating the snapshot.

44. A method of simulating mixed-language circuit designs comprising:
    natively instantiating a hardware description language module within an object-oriented language based design;
    collecting design information from source code for the hardware description language module;
    generating an object-oriented language shell for the hardware description language module based on the collected design information;
    compiling source code for the hardware description language module;
    compiling source code for the object-oriented language based design separately from compiling source code for the hardware description language module;
    elaborating the object-oriented language based design into a snapshot, wherein the design comprises a hardware description language module and the object-oriented language module; and
    simulating the snapshot, wherein the act of natively instantiating comprises providing source browsing for both the hardware description language module and the object-oriented language module.

45. The method of claim 44 wherein elaborating the object-oriented language based design comprises:

constructing a design hierarchy based on instantiation and configuration information in the design;
establishing signal connectivity; and
computing initial values for all module instances in the design.

46. The method of claim 44 wherein natively instantiating a hardware description language module within an object-oriented language based design comprises instantiating the hardware description language module using object-oriented language syntax.

47. The method of claim 44 further comprising linking the compiled source code for the object-oriented language based design into a simulator and an elaborator.

48. A method of simulating mixed-language circuit designs comprising:
natively instantiating a hardware description language module within an object-oriented language based design, wherein the design comprises the hardware description language module and an object-oriented language module, wherein the act of natively instantiating comprises providing source browsing for both the hardware description language module and the object-oriented language module; and
simulating the object-oriented language based design instantiated within the hardware description language module after separately compiling source code for the object-oriented language based design and source code for the hardware description language module.

49. The method of claim 48 wherein natively instantiating a hardware description language module within an object-oriented language based design comprises instantiating the hardware description language module using object-oriented language syntax.

50. The method of claim 48 further comprising collecting design information from source code for the hardware description language module.

51. The method of claim 50 further comprising generating an object-oriented language shell for the hardware description language module based on the collected design information.

52. The method of claim 48 further comprising compiling source code for the hardware description language module.

53. The method of claim 48 further comprising compiling source code for the object-oriented language based design.

54. The method of claim 53 further comprising linking the compiled source code for the object-oriented language based design into a simulator and an elaborator.

55. The method of claim 48 further comprising elaborating the design into a snapshot.

56. The method of claim 55 wherein elaborating the design comprises:
constructing a design hierarchy based on instantiation and configuration information in the design;
establishing signal connectivity; and
computing initial values for all module instances in the design.

57. The method of claim 55 further comprising simulating the snapshot.

* * * * *